(12) United States Patent
Sanchez et al.

(10) Patent No.: US 9,667,875 B2
(45) Date of Patent: May 30, 2017

(54) VISION SYSTEM AND METHOD OF MONITORING SURROUNDINGS OF MACHINE

(71) Applicant: Caterpillar Inc., Peoria, IL (US)

(72) Inventors: Rodrigo Sanchez, Dunlap, IL (US); Peter Petrany, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 210 days.

(21) Appl. No.: 14/601,320

(22) Filed: Jan. 21, 2015

(65) Prior Publication Data

US 2016/0212352 A1 Jul. 21, 2016

(51) Int. Cl.
*B60R 1/00* (2006.01)
*B60R 1/06* (2006.01)
(Continued)

(52) U.S. Cl.
CPC ........... *H04N 5/23296* (2013.01); *B60R 1/00* (2013.01); *G06T 3/00* (2013.01); *H04N 5/265* (2013.01);
(Continued)

(58) Field of Classification Search
CPC ..... B60R 11/04; B60R 1/00; B60R 2300/607; B60R 1/06; B60R 1/0605; H04N 7/181; B60K 2350/2013; G60R 1/002; G06K 9/00778; G06K 9/00785; G06K 9/00791; G06K 9/00798; G06K 9/00805; G06K 9/00812; G06K 9/00818; G06K 9/00825; G06K 9/00832; G06K 9/00845; G06K 9/325; G06K 2209/15; G06T 2207/30236;
(Continued)

(56) References Cited

U.S. PATENT DOCUMENTS 6,268,803 B1 * 7/2001 Gunderson ............ B60Q 9/006
180/168
6,593,960 B1 * 7/2003 Sugimoto ............... B60R 11/04
348/142

(Continued)

FOREIGN PATENT DOCUMENTS

EP 2757782 7/2014
JP 2012105158 5/2012
(Continued)

*Primary Examiner* — Nathnael Aynalem
(74) *Attorney, Agent, or Firm* — Leydig, Voit & Mater, LTD.

(57) ABSTRACT

A vision system for a machine system includes a first set of cameras mounted on the first section and a second set of cameras mounted on the second section of the machine. A controller is coupled to the first set of cameras and the second set of cameras. The controller includes a first and a second image transformation modules to convert a first and a second images captured by the first and the second set of cameras into a first and a second transformed image based at least on a view type, respectively. An image combination module combines the first transformed image and the second transformed image to a combined image with reference to the articulation joint. The image combination module communicates with a display device to display the combined image. The combined image is indicative of surroundings of the first section and the second section of the machine.

19 Claims, 5 Drawing Sheets (51) Int. Cl.
 *H04N 5/232* (2006.01)
 *G06T 3/00* (2006.01)
 *H04N 5/265* (2006.01)

(52) U.S. Cl.
 CPC ... *B60R 2300/303* (2013.01); *B60R 2300/602* (2013.01)

(58) Field of Classification Search
 CPC . G06T 2207/30248; G06T 2207/30252; G06T 2207/30256; G06T 2207/30264; G06T 2207/30268
 See application file for complete search history.

(56) References Cited

U.S. PATENT DOCUMENTS

| | | | | |
|---|---|---|---|---|
| 6,693,524 | B1 * | 2/2004 | Payne | B60Q 9/005 340/431 |
| 7,574,287 | B2 * | 8/2009 | Lang | B60R 1/00 340/431 |
| 2006/0152351 | A1 * | 7/2006 | Daura Luna | B60Q 9/005 340/435 |
| 2009/0309970 | A1 * | 12/2009 | Ishii | B60R 1/00 348/143 |
| 2013/0107045 | A1 * | 5/2013 | Soderlind | B60R 1/04 348/148 |
| 2013/0169469 | A1 * | 7/2013 | Mitsuta | B60R 1/00 342/52 |
| 2013/0182066 | A1 * | 7/2013 | Ishimoto | H04N 7/181 348/38 |
| 2014/0088824 | A1 | 3/2014 | Ishimoto | |
| 2014/0354813 | A1 * | 12/2014 | Ishimoto | H04N 7/181 348/148 |

FOREIGN PATENT DOCUMENTS

| | | |
|---|---|---|
| WO | 2013105597 | 7/2013 |
| WO | 2014020973 | 2/2014 |

\* cited by examiner

VISION SYSTEM AND METHOD OF MONITORING SURROUNDINGS OF MACHINE

TECHNICAL FIELD

The present disclosure relates to a vision system for a machine, and more particularly relates to a vision system and a method of monitoring surroundings of a machine.

BACKGROUND

Machines, such as an articulated truck and a motor grader, include a vision system for monitoring surroundings of the machine. The machine includes a front section and a rear section. The front section is pivotally coupled to the rear section via an articulation joint. One or more cameras may be disposed on the front section and the rear section of the machine to monitor surroundings of the machine. Images captured by the cameras may be processed by a controller and displayed in a monitor for an operator to determine whether any personnel and/or object are around the machine. When multiple cameras are used, images of two or more cameras may overlap. Further, when the front section moves relative to the rear section, images of the cameras mounted on the front section and the rear section may overlap each other. To avoid such overlapping of the images, additional control modules may be required, and hence processing of the images may become complex.

US Patent Publication Number 2014/0088824 discloses a surrounding monitoring system for an articulated machine having a front section and a rear section. The surrounding monitoring system includes a plurality of cameras mounted on the front section and a plurality of cameras mounted on the rear section. An image of the surrounding of the machine is displayed in a monitor. The surrounding monitoring system includes a camera position identifying unit to determine position of cameras based on angle of articulation between the front section and the rear section. The surrounding monitoring system further includes an image transformation device for converting the camera image into a bird's eye view image and an image composing means for converting the individual bird's eye view image to a composite bird's eye view image. The surrounding monitoring system further includes a display image forming device for displaying the composite birds eye view image along with an image of the machine.

SUMMARY OF THE DISCLOSURE

In one aspect of the present disclosure, a vision system for a machine is provided. The machine includes a first section, a second section and an articulation joint pivotally connecting the first section to the second section. The vision system includes a first set of cameras mounted on the first section of the machine, a second set of cameras mounted on the second section of the machine, and a controller communicably coupled to the first set of cameras and the second set of cameras. The controller includes a first image transformation module configured to convert a first image captured by the first set of cameras into a first transformed image based at least on a view type. The controller further includes a second image transformation module configured to convert a second image captured by the second set of cameras into a second transformed image based at least on a view type. The controller further includes an image combination module configured to receive the first transformed image from the first image transformation module and the second transformed image from the second image transformation module. The image combination module is further configured to combine the first transformed image and the second transformed image to obtain a combined image with reference to the articulation joint. The combined image is indicative of surroundings of the first section and the second section of the machine. The vision system further includes a display device communicably coupled to the controller. The display device is configured to display the combined image.

In another aspect of the present disclosure, a machine is provided. The machine includes a first section including a first set of ground engaging members, a second section including a second set of ground engaging members, and an articulation joint configured to pivotally couple the first section to the second section. The machine further includes a vision system. The vision system includes a first set of cameras mounted on the first section, a second set of cameras mounted on the second section, and a controller communicably coupled to the first set of cameras and the second set of cameras. The controller includes a first image transformation module configured to convert a first image captured by the first set of cameras into a first transformed image based at least on a view type. The controller further includes a second image transformation module configured to convert a second image captured by the second set of cameras into a second transformed image based at least on a view type. The controller further includes an image combination module configured to receive the first transformed image from the first image transformation module and the second transformed image from the second image transformation module. The image combination module is further configured to combine the first transformed image and the second transformed image to obtain a combined image with reference to the articulation joint. The combined image is indicative of surroundings of the first section and the second section of the machine. The vision system further includes a display device communicably coupled to the controller. The display device is configured to display the combined image.

In yet another aspect of the present disclosure, a method of monitoring surroundings of a machine is provided. The machine includes a first section, a second section, and an articulation joint pivotally connecting the first section to the second section. The method includes capturing a first image via a first set of cameras. The first set of cameras is mounted on the first section of the machine. The method further includes capturing a second image via a second set of cameras. The second set of cameras is mounted on the second section of the machine. The method further includes converting the first image captured by the first set of cameras into a first transformed image based at least on a view type and converting the second image captured by the second set of cameras into a second transformed image based at least on a view type. The method further includes combining the first transformed image and the second transformed image to obtain a combined image with reference to the articulation joint. The combined image is indicative of surroundings of the first section and the second section of the machine. The method further includes displaying the combined image via a display device.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
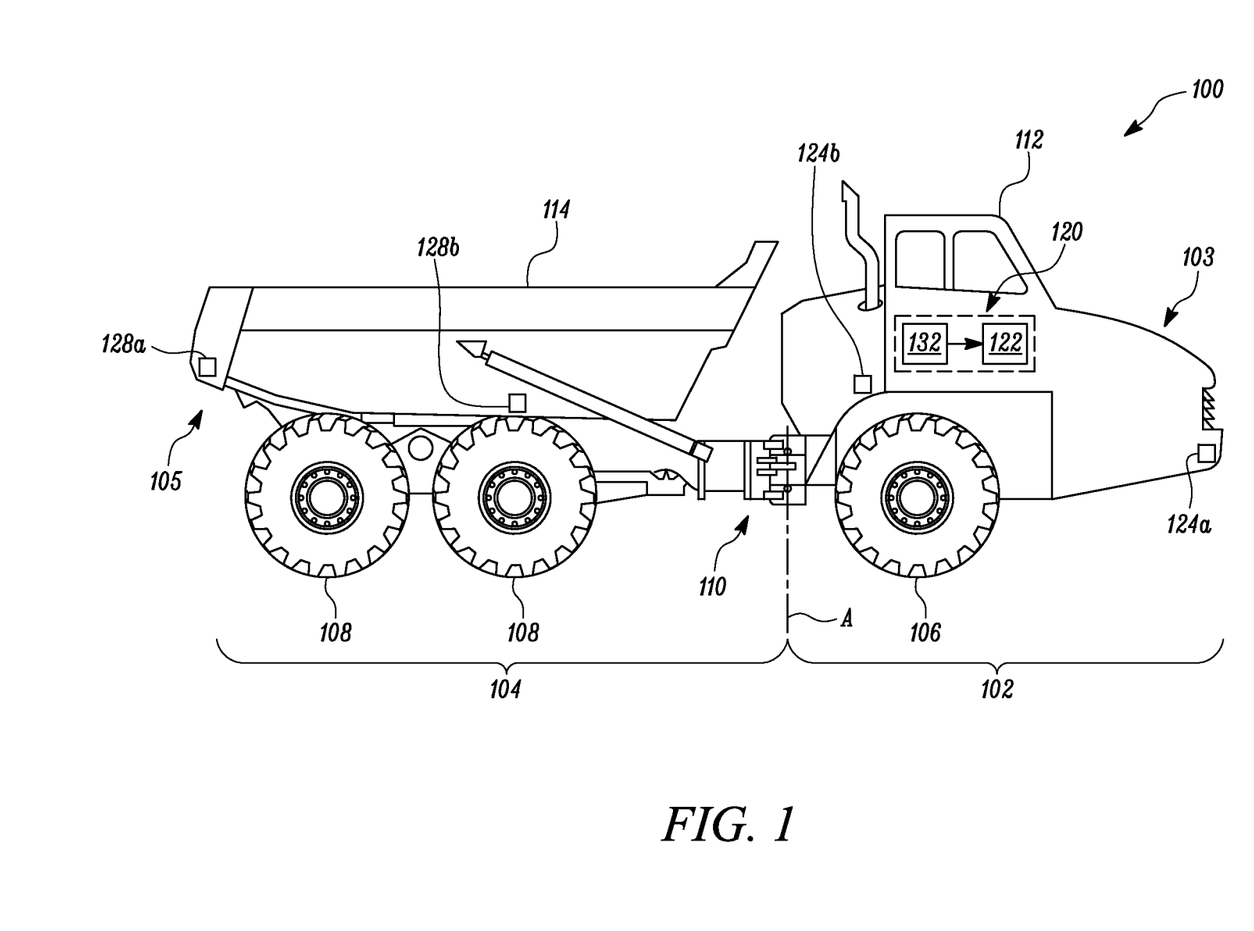
FIG. 1 is a side view of a machine, according to an embodiment of the present disclosure.

FIG. 1 is a side view of a machine 100, according to an embodiment of the present disclosure. In the illustrated embodiment, the machine 100 may be an articulated truck used for various industries including, but not limited to, construction, mining, agriculture and transportation. It may also be contemplated that the machine 100 may be any type of on-road or off-road articulated trucks.

The machine 100 includes a first section 102 and a second section 104 pivotally coupled to the first section 102. The first section 102 may correspond to a front frame 103 of the machine 100. Further, the second section 104 may correspond to a rear frame 105 of the machine 100. The first section 102 includes a first set of ground engaging members 106. In the illustrated embodiment, the first set of ground engaging members 106 may be a pair of wheels. Each of the pair of wheels may be disposed at each side of the first section 102 of the machine 100. Further, the second section 104 includes a second set of ground engaging members 108. In the illustrated embodiment, the second set of ground engaging members 108 may be one or more pair of wheels. Each of the pair of wheels may be disposed at each side of the second section 104 of the machine 100. In an alternative embodiment, at least one of the first set and the second set of ground engaging members 106, 108 may be a track assembly.

The machine 100 further includes an articulation joint 110. The articulation joint 110 is configured to pivotally couple the first section 102 to the second section 104. The first section 102 may be movable to various angular positions relative to the second section 104 about a vertical axis 'A' defined by the articulation joint 110. The second section 104 further includes an operator cab 112. The operator cab 112 may include input devices, such as control levers, joystick, and the like, for driving the machine 100 to forward and backward directions, and for controlling operation of a load carrying body 114 disposed at the second section 104. The input devices may also be used for turning the first section 102 to different angular positions relative to the second section 104 about the vertical axis 'A'.

The machine 100 further includes a vision system 120 configured to display surroundings of the machine 100 via a display device 122. The surroundings of the machine 100 may be a ground surface of a worksite around the machine 100. The vision system 120 is further configured to display the surroundings of the machine 100 with respect to the first section 102 and the second section 104 of the machine 100. A view of the surroundings of the machine 100 may be defined within a predefined perimeter relative to the machine 100. In an embodiment, the display device 122 is disposed within the operator cab 112. In other embodiments, the display device 122 may be disposed at a remote location so that the surroundings of the machine 100 in the worksite may be viewed from the remote location.

Figure 2:
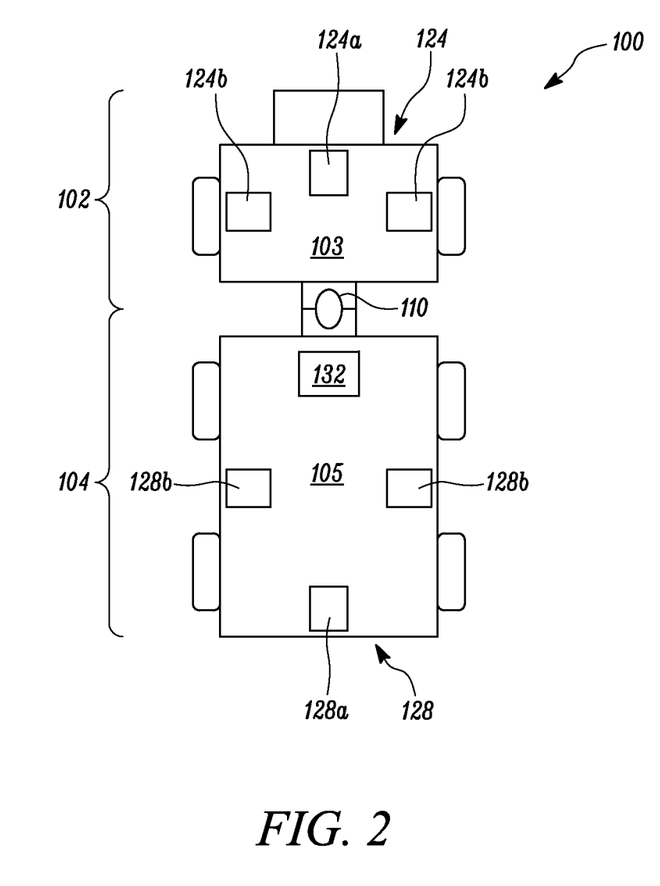
FIG. 2 is a schematic top view of the machine, according to an embodiment of the present disclosure.

FIG. 2 is a schematic top view of the machine 100 having a first set of cameras 124 and a second set of cameras 128 disposed thereon, according to an embodiment of the present disclosure. Referring to FIGS. 1 and 2, the vision system 120 includes the first set of cameras 124 mounted on the first section 102 of the machine 100. The first set of cameras 124 is configured to capture a first image 'FI' corresponding to surroundings of the first section 102. The first set of cameras 124 includes a front camera 124a mounted adjacent to a front end 126 of the first section 102 and a first side camera 124b mounted adjacent to each of the sides of the first section 102. In such a case, images captured by the cameras 124a and 124b may be stitched together to form the first image FI. However, it may be contemplated that at least one camera may also be disposed on the first section 102 of the machine 100. The vision system 120 further includes the second set of cameras 128 mounted on the second section 104 of the machine 100. The second set of cameras 128 is configured to capture a second image 'SI' corresponding to surroundings of the second section 104. The second set of cameras 128 includes a rear camera 128a mounted adjacent to a rear end 130 of the second section 104 and a second side camera 128b mounted adjacent to each of the sides of the second section 104. In such a case, images captured by the cameras 128a and 128b may be stitched together to form the second image SI. However, it may be contemplated that at least one camera may also be disposed on the second section 104 of the machine 100. In an embodiment, the first set of cameras 124 and the second set of cameras 128 may be disposed adjacent to bottom surfaces of the front frame 103 and the rear frame 105 of the first section 102 and the second section 104, respectively. However, it may be contemplated that the first set of cameras 124 and the second set of cameras 128 may be disposed at any location of the first section 102 and the second section 104, respectively. The number of first and second set of cameras 124, 128 shown in FIG. 2 is exemplary in nature, and in various embodiments, the first section 102 and the second section 104 may include any number of cameras as per requirements.

The vision system 120 further includes a controller 132 communicably coupled to the first set of cameras 124 and the second set of cameras 128. The controller 132 may be disposed within the operator cab 112. However, it may be contemplated that the controller 132 may be disposed at any location of the machine 100. In other embodiments, the controller 132 may be disposed at a remote location. The controller 132 is also configured to be in communication with the display device 122. In an alternative embodiment, the display device 122 may be integrally configured with the controller 132 depends on applications of the vision system 120 for the machine 100. In an example, the controller 132 may be embodied as a vision control unit associated the machine 100. The controller 132 may further include input/output ports configured to be coupled with the first set of cameras 124, the second set of cameras 128 and the display device 122. The controller 132 may also configured to be in communication with one or more input devices to receive inputs from an operator.

Figure 3:
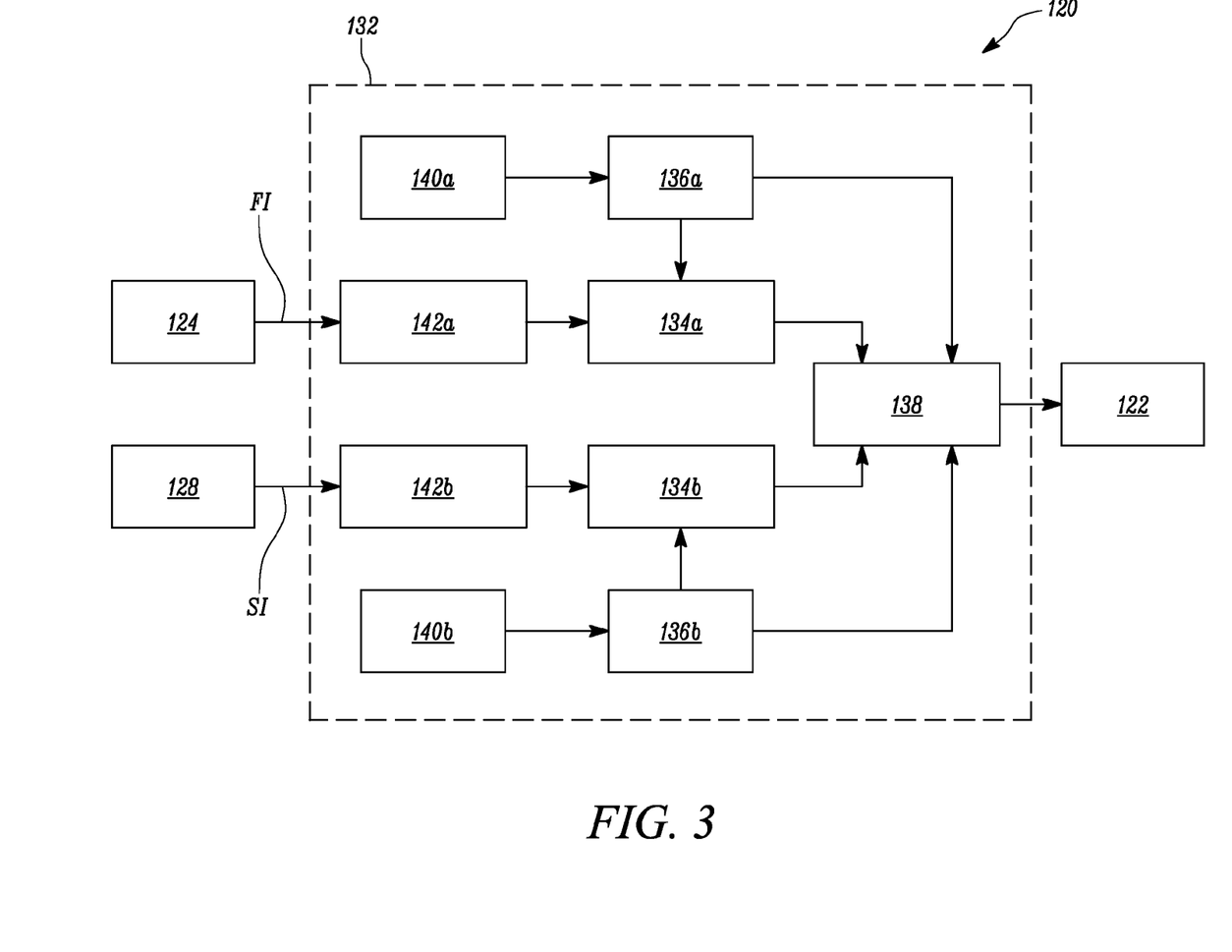
FIG. 3 is a block diagram of a controller of the machine, according to an embodiment of the present disclosure.

FIG. 3 shows a block diagram of the controller 132, according to an embodiment of the present disclosure. The controller 132 includes a first image transformation module 134a configured to convert the first image 'FI' into a first transformed image. Specifically, the first image transformation module 134a is configured to receive images from the front camera 124a and each of the first side cameras 124b. The received camera images from the first set of cameras 124 may be collectively referred as the first image 'FI'. Each of the received camera images may be further transformed to the first transformed image, such as a top surround view. The first transformed image may correspond to the surroundings of the first section 102 of the machine 100.

Similarly, the controller 132 further includes a second image transformation module 134b configured to convert the second image 'SI' into a second transformed image. As described above, images received from the rear camera 128a and each of the second side cameras 128b, collectively referred as the second image 'SI', may be transformed to the second transformed image. The second transformed image may correspond to the surroundings of the second section 104 of the machine 100.

The controller 132 further includes a first image configuration module 136a. The first image configuration module 136a is configured to be in communication with the first image transformation module 134a and an image combination module 138. The first image configuration module 136a may be configured to provide input corresponding to a view type of the image of the surroundings and the machine 100. The view type of the image is one of a three dimensional view, a perspective view, a two dimensional view, a top surround view and a side view based on input from the operator.

Similarly, the controller 132 further includes a second image configuration module 136b. The second image configuration module 136b is configured to be in communication with the second image transformation module 134b and the image combination module 138. The image combination module 138 is configured to receive the first transformed image from the first image transformation module 134a and the second transformed image from the second image transformation module 134b. The image combination module 138 is further configured to receive inputs corresponding to the view type of the image from the first and the second image configuration module 136a, 136b. The image combination module 138 is further configured to combine the first transformed image and the second transformed image to obtain a combined image (shown in FIG. 4) with reference to the articulation joint 110 based on the view type.

The controller 132 further includes a first image selection module 140a and a second image selection module 140b. The first image selection module 140a is configured to be in communication with the first image configuration module 136a and the second image selection module 140b is configured to be in communication with the second image configuration module 136b. The first and the second image selection modules 140a, 140b are configured to communicate the view type with the first and the second image configuration modules 136a, 136b, respectively, based on input from the operator. The first and the second image transformation module 134a, 134b are configured to convert the first image 'FI' and the second image 'SI' into the first transformed image and the second transformed image based at least the view type selected by the operator via the first and the second image selection module 140a, 140b, respectively.

The controller 132 further includes a first image correction module 142a configured to correct the first image 'FI' captured by the first set of cameras 124 based on a calibration parameter associated with the first set of cameras 124. The first image correction module 142a is configured to be in communication with the front camera 124a and each of the first side cameras 124b to receive corresponding individual image signals. The first image correction module 142a is further configured to rectify distortion in each of the camera images received from the first set of cameras 124. Distortion in the images may be rectified based on the calibration parameter preset in the front camera 124a and each of the first side cameras 124b. The calibration parameter may include, but not limited to, focal length, image sensor format and principal point. Further, the calibration parameter may be set based on pixel quality of the first image 'FI' to be captured.

In an example, the calibration parameter of the front camera 124a and each of the first side cameras 124b may be preset by manufacturer of the cameras. It may also be contemplated that the calibration parameter of each camera may be set by the operator. The first image correction module 142a is further configured to be in communication with the first image transformation module 134a. Thus, the first image correction module 142a receives the first image 'FI' from the first set of cameras 124 and communicates a corrected image with the first image transformation module 134a.

Similarly, the controller 132 further includes a second image correction module 142b configured to correct the second image 'SI' captured by the second set of cameras 128 based on a calibration parameter associated with the second set of cameras 128. As described above, the second image correction module 142b is also configured to receive the second image 'SI' from the rear camera 128a and each of the second side cameras 128b, and communicates the corrected image to the second image transformation module 134b.

Figure 4:
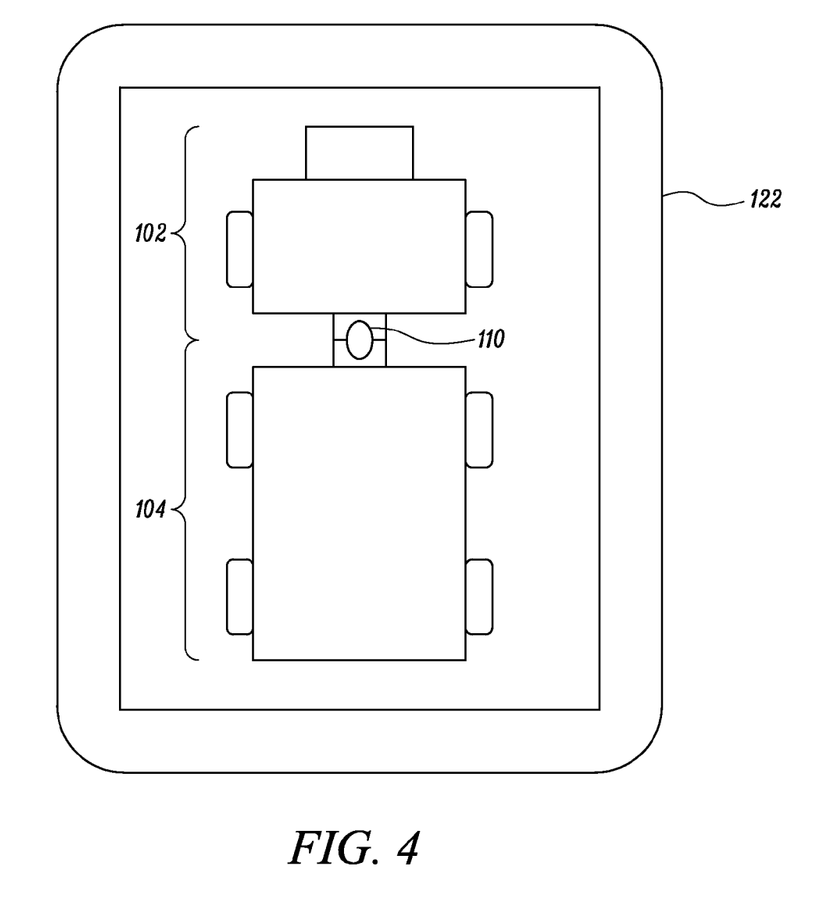
FIG. 4 is a display device displaying an image of the machine and surroundings thereof, according to an embodiment of the present disclosure.

FIG. 4 shows the display device 122 displaying the combined image of the machine 100, according to an embodiment of the present disclosure. The image combination module 138 may communicate the combined image with the display device 122 to display the image of the machine 100 along with the surroundings of the first section 102 and the second section 104. The combined image is indicative of the surroundings of the first section 102 and the second section 104 of the machine 100. The display device 122 may be a CRT display, a LED display, a LCD display, or any other display device known in the art. In another embodiment, the display device 122 may receive the first transformed image corresponding to the surroundings of the first section 102. Similarly, the second transformed image corresponding to the surroundings of the second section 104 may be received by the display device 122. The first transformed image and the second transformed image may be further combined with reference to the articulation joint 110 of the machine 100 and displayed as the combined image on the display device 122.

INDUSTRIAL APPLICABILITY

Figure 5:
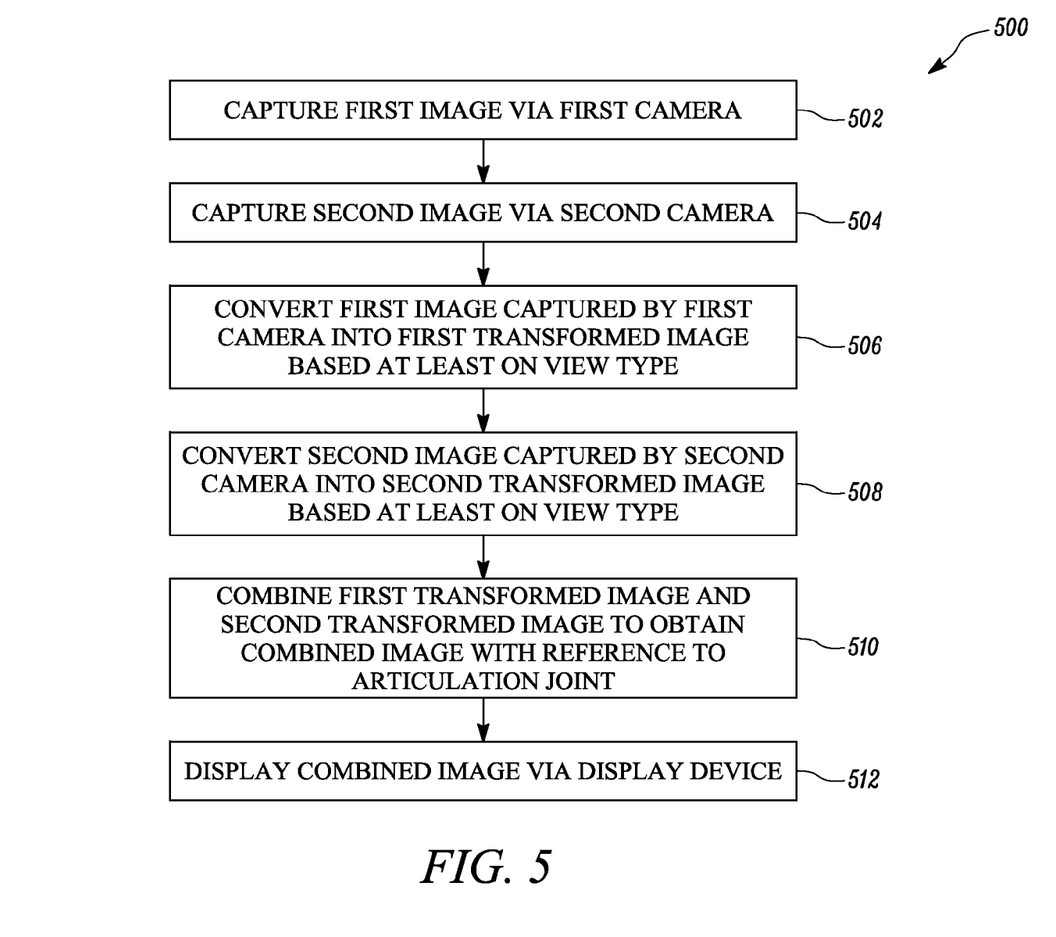
FIG. 5 is a flowchart of a method of monitoring surroundings of the machine, according to an embodiment of the present disclosure.

The present disclosure relates to the vision system 120 and a method 500 of monitoring the surroundings of the machine 100 in the worksite. The vision system 120 includes the first set of cameras 124 disposed on the first section 102 and the second set of cameras 128 disposed on the second section 104 to display the surroundings of the first section 102 and the second section 104, respectively. The image combination module 138 combines the surroundings of the first section 102 and the second section 104 and display as the combined image along with the image of the machine 100 in the display device 122.

FIG. 5 is a flowchart of the method 500 of monitoring the surroundings of the machine 100, according to an embodiment of the present disclosure. The method 500 may be described in detail with respect to various steps. At step 502, the method 500 includes capturing the first image 'FI' via the first set of cameras 124 mounted on the first section 102 of the machine 100. The front camera 124*a* captures the surroundings of the machine 100 adjacent to the front end 126 thereof. Each of the first side cameras 124*b* captures the surroundings of the machine 100 adjacent to the respective sides of the first section 102. Thus, the first image 'FI' corresponding to the surroundings of the first section 102 of the machine 100 is captured by the first set of cameras 124.

At step 504, the method 500 includes capturing the second image 'SI' via the second set of cameras 128 mounted on the second section 104 of the machine 100. The rear camera 128*a* captures the surroundings of the machine 100 adjacent to the rear end 130 thereof. Each of the second side cameras 128*b* captures the surroundings of the machine 100 adjacent to the respective sides of the second section 104. Thus, the second image 'SI' corresponding to the surroundings of the second section 104 of the machine 100 is captured by the second set of cameras 128.

In an embodiment, the first and the second set of cameras 124, 128 may capture image of the surroundings of the first section 102 and the second section 104, respectively, based on input from the operator. In another embodiment, the first and the second set of cameras 124, 128 may capture image of the surroundings of the first section 102 and the second section 104, respectively, based on machine operating conditions, such as activation of an engine associated with the machine 100.

In an embodiment, the method 500 further includes correcting the first image 'FI' captured by the first set of cameras 124 based on the calibration parameter associated with the first set of cameras 124. The first image 'FI' captured by the first set of cameras 124 is communicated to the first image correction module 142*a*. The first image correction module 142*a* rectifies distortion in the image based on the calibration parameter.

The method 500 further includes correcting the second image 'SI' captured by the second set of cameras 128 based on the calibration parameter associated with the second set of cameras 128. The second image 'SI' captured by the second set of cameras 128 is communicated to the second image correction module 142*b*. The second image correction module 142*b* rectifies distortion in the image based on the calibration parameter.

At step 506, the method 500 includes converting the first image 'FI' captured by the first set of cameras 124 into the first transformed image based at least on the view type. The corrected camera image from the first image correction module 142*a* is communicated to the first image transformation module 134*a*. The first image transformation module 134*a* converts the first image 'FI' into the first transformed image. Further, the first image 'FI' is converted into the first transformed image based on the input corresponding to the view type received from the first image configuration module 136*a*. The first image configuration module 136*a* receives input from the first image selection module 140*a* based on the input from the operator.

At step 508, the method 500 includes converting the second image 'SI' captured by the second set of cameras 128 into the second transformed image based at least on the view type. The corrected camera image from the second image correction module 142*b* is communicated to the second image transformation module 134*b*. The second image transformation module 134*b* converts the second image 'SI' into the second transformed image. Further, the second image 'SI' is converted into the second transformed image based on the signal corresponding to the view type from the second image configuration module 136*b*. The second image configuration module 136*b* receives input from the second image selection module 140*b* based on the input from the operator.

At step 510, the method 500 includes combining the first transformed image and the second transformed image to obtain the combined image with reference to the articulation joint 110. The first image transformation module 134*a* communicates the first transformed image with the image combination module 138. Similarly, the second image transformation module 134*b* communicates the second transformed image with the image combination module 138. The image combination module 138 combines the first transformed image and the second transformed image to form the combined image with reference to the articulation joint 110.

At step 512, the method 500 includes displaying the combined image via the display device 122. Referring to FIG. 4, the image combination module 138 communicates signals corresponding to the combined image to the display device 122. In the display device 122, the surroundings of the first section 102 and the surroundings of the second section 104 is combined with reference to the articulation joint 110 of the machine 100.

The vision system 120 and the above method 500 of monitoring the surroundings of the machine 100 may process the images received from the first set of cameras 124 and the second set of cameras 128 separately. The images may be transformed into the first transformed image and the second transformed image. Further, the first transformed image and the second transformed image may be combined with reference to the articulation joint 110 of the machine 100. Thus, overlapping of the first set of cameras 124 and the second set of cameras 128 may be avoided. Hence, processing of the images received from the first and the second set of cameras 124, 128 may be simplified as separate control module for eliminating overlapping of the images is not required.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A vision system for a machine having a first section, a second section and an articulation joint pivotally connecting the first section to the second section, the vision system comprising:
    a first set of cameras mounted on the first section of the machine;
    a second set of cameras mounted on the second section of the machine;
    a display device configured to display an image;
    a controller communicably coupled to the first set of cameras, the second set of cameras, and the display device, the controller being configured to:
       stitch together images captured by the first set of cameras to form a first image;
       convert the first image captured by the first set of cameras into a first transformed image based at least on a view type;

stitch together images captured by the second set of cameras to form a second image;

convert the second image captured by the second set of cameras into a second transformed image based at least on a view type;

after forming the first and second images, receive the first transformed image and the second transformed image;

after receiving the first transformed image and the second transformed image, combine the first transformed image and the second transformed image to obtain a combined image with reference to the articulation joint, wherein the combined image is indicative of surroundings of the first section and the second section of the machine; and display the combined image on the display device.

2. The vision system of claim 1, wherein the view type is one of a three dimensional view, a perspective view, a two dimensional view, a top surround view and a side view.

3. The vision system of claim 2, wherein the controller is further configured to:

select the view type based on a user input; and
select the view type based on a user input.

4. The vision system of claim 2, wherein the controller is further configured to combine the first image and the second image with reference to the articulation joint based on the view type.

5. The vision system of claim 1, wherein the first set of cameras comprises:

a front camera mounted adjacent to a front end of the first section; and a first side camera mounted adjacent to each of the sides of the first section.

6. The vision system of claim 1, wherein the second set of cameras comprises:

a rear camera mounted adjacent to a rear end of the second section; and a second side camera mounted adjacent to each of the sides of the second section.

7. The vision system of claim 1, wherein the controller is further configured to:

correct the first image captured by the first set of cameras based on a calibration parameter associated with the first set of cameras; and correct the second image captured by the second set of cameras based on a calibration parameter associated with the second set of cameras.

8. The vision system of claim 1, wherein the display device is disposed within an operator cab of the machine.

9. A machine comprising:

a first section comprising a first set of ground engaging members;

a second section comprising a second set of ground engaging members;

an articulation joint configured to pivotally couple the first section to the second section; and a vision system comprising:

a first set of cameras mounted on the first section;
a second set of cameras mounted on the second section;
a display device configured to display an image;
a controller communicably coupled to the first set of cameras, the second set of cameras, and the display device, the controller being configured to:
stitch together images captured first set of cameras to form a first image;

convert the first image captured by the first set of cameras into a first transformed image based at least on a view type;

stitch together images captured by the second set of cameras to form a second image;

convert the second image captured by the second set of cameras into a second transformed image based at least on a view type;

after forming the first and second images, receive the first transformed image and the second transformed image;

after receiving the first transformed image and the second transformed image, combine the first transformed image and the second transformed image to obtain a combined image with reference to the articulation joint, wherein the combined image is indicative of surroundings of the first section and the second section of the machine; and display the combined image on the display device.

10. The machine of claim 9, wherein the view type is one of a three dimensional view, a perspective view, a two dimensional view, a top surround view and a side view.

11. The machine of claim 10, wherein the controller is further configured to:

select the view type based on a user input; and
select the view type based on a user input.

12. The machine of claim 10, wherein the controller is further configured to combine the first image and the second image with reference to the articulation joint based on the view type.

13. The machine of claim 9, wherein the first set of cameras comprises:

a front camera mounted adjacent to a front end of the first section; and a first side camera mounted adjacent to each of the sides of the first section.

14. The machine of claim 9, wherein the second set of cameras comprises:

a rear camera mounted adjacent to a rear end of the second section; and a second side camera mounted adjacent to each of the sides of the second section.

15. The machine of claim 9, wherein the controller is further configured:

correct the first image captured by the first set of cameras based on a calibration parameter associated with the first set of cameras; and correct the second image captured by the second set of cameras based on a calibration parameter associated with the second set of cameras.

16. The machine of claim 9, wherein the first section further comprises an operator cab, and wherein the display device is disposed within the operator cab.

17. A method of monitoring surroundings of a machine having a first section, a second section and an articulation joint pivotally connecting the first section to the second section, the method comprising:

capturing, via a first set of cameras, a first image, wherein the first set of cameras is mounted on the first section of the machine;

stitching together images captured by the first set of camera to form a first image;

capturing, via a second set of cameras, a second image, wherein the second set of cameras is mounted on the second section of the machine;

stitching together images captured by the second set of cameras to form a second image;

after forming the first image, converting the first image captured by the first set of cameras into a first transformed image based at least on a view type;
after forming the first image, converting the second image captured by the second set of cameras into a second transformed image based at least on a view type;
after converting the first and second images to define the first and second transformed images, respectively, combining the first transformed image and the second transformed image to obtain a combined image with reference to the articulation joint, wherein the combined image is indicative of surroundings of the first section and the second section of the machine; and
displaying, via a display device, the combined image.

18. The method of claim 17 further comprising:
correcting the first image captured by the first set of cameras based on a calibration parameter associated with the first set of cameras; and
correcting the second image by the second set of cameras based on a calibration parameter associated with the second set of cameras.

19. The method of claim 17 further comprising selecting the view type from one of a three dimensional view, a perspective view, a two dimensional view, a top surround view and a side view.

* * * * *